(12) United States Patent
Itoh et al.

(10) Patent No.: US 9,013,906 B2
(45) Date of Patent: *Apr. 21, 2015

(54) POWER SYSTEM-INTERCONNECTED INVERTER DEVICE

(71) Applicant: Murata Manufacturing Co., Ltd., Nagaokakyo-shi, Kyoto-fu (JP)

(72) Inventors: Junichi Itoh, Nagaokakyo (JP); Yuichi Noge, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 114 days.

This patent is subject to a terminal disclaimer.

(21) Appl. No.: 13/773,715

(22) Filed: Feb. 22, 2013

(65) Prior Publication Data

US 2014/0063885 A1    Mar. 6, 2014

(30) Foreign Application Priority Data

Aug. 29, 2012 (JP) ................................. 2012-188727

(51) Int. Cl.
*H02M 7/5387* (2007.01)
*H02M 7/487* (2007.01)
*H02M 1/00* (2006.01)

(52) U.S. Cl.
CPC ............ *H02M 7/5387* (2013.01); *H02M 7/487* (2013.01); *H02M 2001/007* (2013.01)

(58) Field of Classification Search
CPC . H02M 3/33523; H02M 7/003; H02M 7/537; H02M 7/538; H02M 7/5387; H02M 7/53871

USPC .......................... 363/131, 132, 80, 95, 97, 98, 363/56.01–56.12, 16–20, 21.04, 21.1, 21.11
See application file for complete search history.

(56) References Cited

U.S. PATENT DOCUMENTS

| | | | |
|---|---|---|---|
| 2005/0139259 A1* | 6/2005 | Steigerwald et al. | 136/293 |
| 2011/0013438 A1* | 1/2011 | Frisch et al. | 363/131 |
| 2011/0299312 A1* | 12/2011 | Karraker et al. | 363/132 |
| 2012/0134189 A1* | 5/2012 | Krein | 363/98 |

(Continued)

FOREIGN PATENT DOCUMENTS

| | | |
|---|---|---|
| EP | 2 251 969 A1 | 11/2010 |
| JP | 09-163610 A | 6/1997 |

(Continued)

OTHER PUBLICATIONS

Karaki et al., "Experimental Verification of Multi-level Circuit for Single-phase Three-wire System using H-bridge Clamp Circuit," Institute of Electrical Engineers of Japan Industry Applications Tournament, Aug. 21, 2012.

*Primary Examiner* — Adolf Berhane
*Assistant Examiner* — Kevin H Sprenger
(74) *Attorney, Agent, or Firm* — Keating & Bennett, LLP

(57) ABSTRACT

In a power-system-interconnected inverter device, PI control circuits obtain voltage correction values in directions reducing the current errors on the basis of current errors serving as differences between target current values and detection values. Multiplexers provide modulation circuits with voltage target values corrected by the voltage correction values being added to voltage detection values. The modulation circuits provide gate signals for switch elements in multilevel circuits. In addition, a sign circuit provides gate signals for switch elements in a bridge clamping circuit.

16 Claims, 28 Drawing Sheets

(56) References Cited

U.S. PATENT DOCUMENTS

2012/0218795 A1* 8/2012 Mihalache .................. 363/97
2013/0155747 A1* 6/2013 Wang ......................... 363/132

FOREIGN PATENT DOCUMENTS

| JP | 2006-223009 A | 8/2006 |
| JP | 2010-246267 A | 10/2010 |

* cited by examiner

FIG. 4

| STATE | H | Mc | Md | L |
|---|---|---|---|---|
| Vo | Vdc/2 | Vdc/4 | Vdc/4 | 0 |
| S1 | ON | ON | OFF | OFF |
| S2 | ON | OFF | ON | OFF |
| S3 | OFF | ON | OFF | ON |
| S4 | OFF | OFF | ON | ON |

FIG. 8

| STATE | H | Mc | Md | L |
|---|---|---|---|---|
| Vo | $-V_{dc}/2$ | $-V_{dc}/4$ | $-V_{dc}/4$ | 0 |
| S5 | OFF | OFF | ON | ON |
| S6 | OFF | ON | OFF | ON |
| S7 | ON | OFF | ON | OFF |
| S8 | ON | ON | OFF | OFF |

FIG. 12

| | S1 | S2 | S3 | S4 | S5 | S6 | S7 | S8 | S1U =S2W | S2U =S1W | Vu INSTANTANEOUS VOLTAGE OF TERMINAL U | Vw INSTANTANEOUS VOLTAGE OF TERMINAL W |
|---|---|---|---|---|---|---|---|---|---|---|---|---|
| CP1(H) | ON | ON | OFF | OFF | OFF | OFF | ON | ON | ON | OFF | Vdc/2 | −Vdc/2 |
| CP2(Mc) | ON | OFF | ON | OFF | OFF | ON | OFF | ON | ON | OFF | Vdc/4 | −Vdc/4 |
| CP3(Md) | OFF | ON | OFF | ON | ON | OFF | ON | OFF | ON | OFF | Vdc/4 | −Vdc/4 |
| CP4(L) | OFF | OFF | ON | ON | ON | ON | OFF | OFF | ON | OFF | 0 | 0 |
| CP5(L) | OFF | OFF | ON | ON | ON | ON | OFF | OFF | OFF | ON | 0 | 0 |
| CP6(Md) | OFF | ON | OFF | ON | OFF | ON | OFF | ON | OFF | ON | −Vdc/4 | Vdc/4 |
| CP7(Mc) | ON | OFF | ON | OFF | OFF | ON | OFF | ON | OFF | ON | −Vdc/4 | Vdc/4 |
| CP8(H) | ON | ON | OFF | OFF | OFF | OFF | ON | ON | OFF | ON | −Vdc/2 | Vdc/2 |

FIG. 16

| TIME DIVISION | Vu*TARGET VALUE OF Vu DIVISION | Vw*TARGET VALUE OF Vw DIVISION | SWITCHING PATTERN |
|---|---|---|---|
| I, III | [0∼+Vdc/4] | [0∼-Vdc/4] | CP4 ⇄ (CP2⇄CP3) |
| II | [+Vdc/4∼+Vdc/2] | [-Vdc/4∼-Vdc/2] | (CP2⇄CP3) ⇄ CP1 |
| IV, VI | [0∼-Vdc/4] | [0∼+Vdc/4] | CP5 ⇄ (CP6⇄CP7) |
| V | [-Vdc/4∼-Vdc/2] | [+Vdc/4∼+Vdc/2] | (CP6⇄CP7) ⇄ CP8 |

FIG. 23A

| Q12 | Q11 | S1 | S2 | S3 | S4 |
|---|---|---|---|---|---|
| L | L | OFF | OFF | ON | ON |
| L | H | ON | OFF | ON | OFF |
| H | L | OFF | ON | OFF | ON |
| H | H | ON | ON | OFF | OFF |

FIG. 23B

| O22 | Q21 | S5 | S6 | S7 | S8 |
|---|---|---|---|---|---|
| L | L | OFF | OFF | ON | ON |
| L | H | ON | OFF | ON | OFF |
| H | L | OFF | ON | OFF | ON |
| H | H | ON | ON | OFF | OFF |

FIG. 24A

|  | S1 | S2 | S3 | S4 | OUTPUT VOLTAGE OF FIRST THREE-LEVEL CIRCUIT |
|---|---|---|---|---|---|
| CP1 | ON | ON | OFF | OFF | +Vdc/2 |
| CP2 | ON | OFF | ON | OFF | +Vdc/4 |
| CP3 | OFF | ON | OFF | ON | +Vdc/4 |
| CP4 | OFF | OFF | ON | ON | 0 |

FIG. 24B

|  | S5 | S6 | S7 | S8 | OUTPUT VOLTAGE OF SECOND THREE-LEVEL CIRCUIT |
|---|---|---|---|---|---|
| CP5 | ON | ON | OFF | OFF | 0 |
| CP6 | OFF | ON | OFF | ON | −Vdc/4 |
| CP7 | ON | OFF | ON | OFF | −Vdc/4 |
| CP8 | OFF | OFF | ON | ON | −Vdc/2 |

FIG. 25

| TIME DIVISION | THREE-LEVEL CIRCUIT | SWITCHING PATTERN | BRIDGE CLAMPING CIRCUIT | $V_u$ ~ AVERAGE VOLTAGE OF TERMINAL U | $V_w$ ~ AVERAGE VOLTAGE OF TERMINAL W |
|---|---|---|---|---|---|
| I, III | FIRST | CP4 ⇄ (CP2 ⇄ CP3) | S1U=S2W=ON S2U=S1W=OFF | [0~+Vdc/4] | [−Vdc/4~0] |
|  | SECOND | CP5 ⇄ (CP6 ⇄ CP7) |  |  |  |
| II | FIRST | (CP2 ⇄ CP3) ⇄ CP1 |  | [+Vdc/4~+Vdc/2] | [−Vdc/2~−Vdc/4] |
|  | SECOND | (CP6 ⇄ CP7) ⇄ CP8 |  |  |  |
| IV, VI | FIRST | CP4 ⇄ (CP2 ⇄ CP3) | S1U=S2W=OFF S2U=S1W=ON | [−Vdc/4~0] | [0~+Vdc/4] |
|  | SECOND | CP5 ⇄ (CP6 ⇄ CP7) |  |  |  |
| V | FIRST | (CP2 ⇄ CP3) ⇄ CP1 |  | [−Vdc/2~−Vdc/4] | [+Vdc/4~+Vdc/2] |
|  | SECOND | (CP6 ⇄ CP7) ⇄ CP8 |  |  |  |

POWER SYSTEM-INTERCONNECTED INVERTER DEVICE

BACKGROUND OF THE INVENTION

1. Field of the Invention

The present invention relates to a DC/AC inverter device, and, in particular, relates to a power-system-interconnected inverter device including a multilevel circuit.

2. Description of the Related Art

In recent years, for example, solar power generation systems have prevailed, and, from a viewpoint of the high efficiency thereof, non-insulated types have entered the mainstream of power-system-interconnected inverters (hereinafter, a power system is simply referred to as a "system"). So as to generate a substantially sinusoidal voltage in an insulated type inverter (so as to inject a substantially sinusoidal current into a system), an inverter device has been disclosed, for example, in Japanese Unexamined Patent Application Publication No. 2006-223009, the inverter device being equipped with a multilevel circuit outputting a plurality of voltages whose number is greater than or equal to three.

In FIG. 1 in Japanese Unexamined Patent Application Publication No. 2006-223009, the configuration of a five-level inverter is disclosed where a series circuit including four capacitors and a series circuit including eight switch elements are provided between the positive and negative electrode terminals of a direct-current power supply and switch elements and diodes are connected between the connection points of these capacitors and the connection points of these switch elements.

When an inverter device cooperating with a system is configured, three sets of the single-phase inverter devices are provided in an inverter device connected to, for example, a system of a three-phase alternating current. In addition, so as to configure an inverter device connected to, for example, a household single-phase three-wire system, two sets of the single-phase inverter devices are provided.

However, if the number of levels is n, switch elements whose number is 2(n−1) are necessary for a multilevel circuit. Therefore, in particular, for household use, an increase in the cost of a semiconductor element or another passive component becomes a major issue.

SUMMARY OF THE INVENTION

Accordingly, preferred embodiments of the present invention provide a power-system-interconnected inverter device that is capable of being provided with a small number of switch elements and which is small and low in cost.

According to a preferred embodiment of the present invention, a power-system-interconnected inverter device includes a first three-level circuit including first, second, third and fourth preceding-stage switch elements connected in series between a first input end of a direct-current power supply and a neutral point and a first charging and discharging capacitor including a first end that is connected to a connection point between the first preceding-stage switch element and the second preceding-stage switch element and a second end that is connected to a connection point between the third preceding-stage switch element and the fourth preceding-stage switch element, a second three-level circuit including fifth, sixth, seventh and eighth preceding-stage switch elements connected in series between a neutral point and a second input end of the direct-current power supply and a second charging and discharging capacitor including a first end that is connected to a connection point between the fifth preceding-stage switch element and the sixth preceding-stage switch element and a second end that is connected to a connection point between the seventh preceding-stage switch element and the eighth preceding-stage switch, a bridge clamping circuit including first, second, third and fourth subsequent-stage switch elements bridge-connected to first to fourth terminals wherein a first end is connected to a connection point between the second preceding-stage switch element and the third preceding-stage switch element and a second end is connected to a connection point between the sixth preceding-stage switch element and the seventh preceding-stage switch element, a first inductor connected between a first output end and a connection point between the first subsequent-stage switch element and the second subsequent-stage switch element in the bridge clamping circuit, a second inductor connected between a second output end and a connection point between the third subsequent-stage switch element and the fourth subsequent-stage switch element in the bridge clamping circuit, a detection unit arranged to detect an output current and an output voltage of a single-phase three-wire power system having a U-phase and a W-phase, a amplification unit arranged to amplify a current error serving as an error of the output current with respect to a current target value of a substantially sinusoidal wave, a voltage correction value obtaining unit arranged to obtain a voltage correction value in a direction reducing the current error, a voltage target value obtaining unit arranged to obtain a voltage target value by superimposing the voltage correction value on a detection value of the output voltage, a PWM-modulating unit arranged to obtain a PWM-modulated signal of the voltage target value, a switch element drive unit arranged to drive the first to fourth preceding-stage switch elements and the fifth to eighth preceding-stage switch elements based on the PWM-modulated signal, and a switch unit arranged to switch a state of the bridge clamping circuit based on a sign of the voltage target value.

As a result of this configuration, a multilevel circuit is simply configured to include switch elements whose number is smaller than a multilevel circuit included in an inverter device of the related art, and it is possible to provide a small and low-cost power-system-interconnected inverter device.

It is preferable that the power-system-interconnected inverter device includes a multiplexer arranged to switch an output of a voltage target value for the PWM-modulating unit used for the first three-level circuit (used for a positive half cycle) and an output of a voltage target value for the PWM-modulating unit used for the second three-level circuit (used for a negative half cycle) on the basis of the sign of the voltage target value.

As a result of this configuration, it is possible to provide a power-system-interconnected inverter device supplying electric power to a single-phase three-wire system, using a simple circuit, and it is also possible to reduce the cost thereof.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a diagram illustrating a relationship between states of four switch elements in the first three-level circuit and an output voltage (electric potential).

FIG. 8 is a diagram illustrating a relationship between states of four switch elements in the second three-level circuit and an output voltage (electric potential).

FIG. 12 is a diagram illustrating a relationship among the states of the eight preceding-stage switch elements, the states of the four subsequent-stage switch elements, and instantaneous values of output voltages.

FIG. 16 is a diagram illustrating a relationship among time divisions and voltage divisions in FIG. 15 and switching patterns.

FIGS. 23A and 23B are diagrams illustrating output signals of PWM modulation circuits and states of the switch elements due to output signals of switch element drive circuits.

FIG. 24A is a diagram illustrating a relationship between the states of the switch elements in the first three-level circuit and the output voltage thereof in an inverter device in a second preferred embodiment of the present invention, and FIG. 24B is a diagram illustrating a relationship between the states of the switch elements in the second three-level circuit and the output voltage thereof.

FIG. 25 is a diagram illustrating a relationship among a time division illustrated in FIG. 15, the switching patterns of the first and second three-level circuits, a state of a bridge clamping circuit, and average voltages of terminals.

DETAILED DESCRIPTION OF THE PREFERRED EMBODIMENTS

Preferred embodiments of the present invention will be sequentially described with reference to individual drawings.

First Preferred Embodiment

Figure 1:
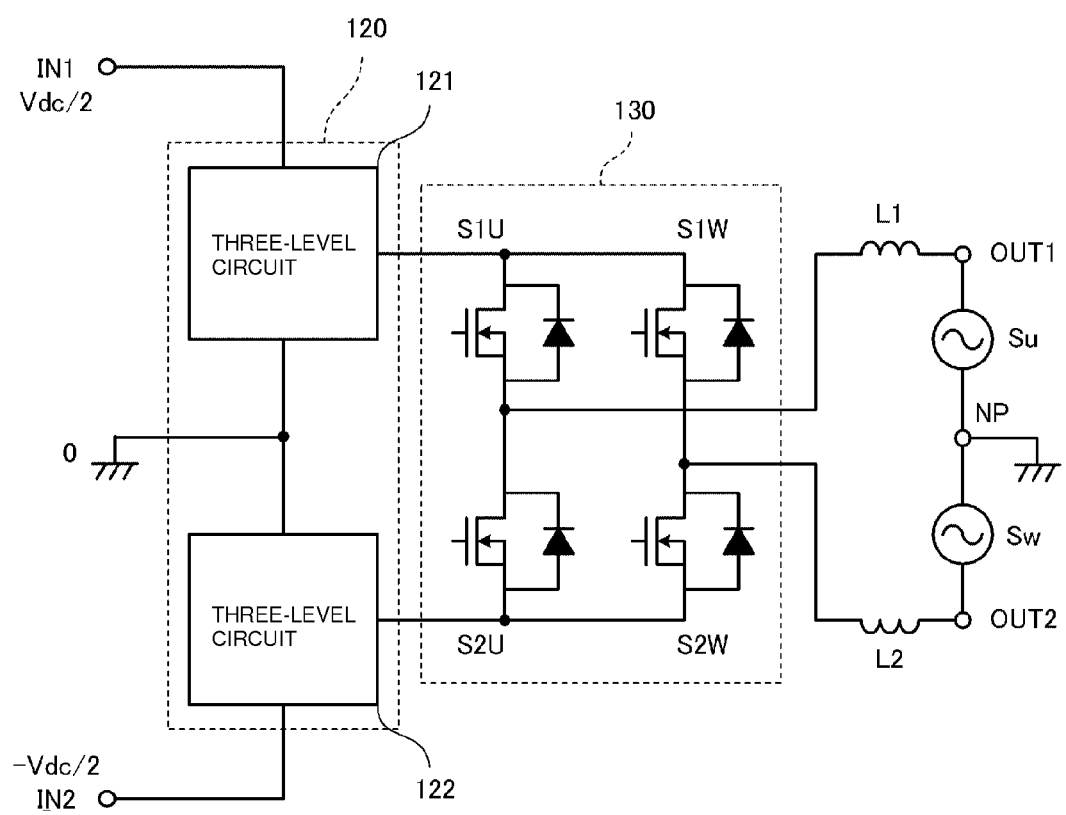
FIG. 1 is a partially blocked circuit diagram of an inverter device according to a first preferred embodiment of the present invention.

FIG. 1 is the partially blocked circuit diagram of an inverter device 101 according to a first preferred embodiment of the present invention. The inverter device 101 preferably includes a first input end IN1 and a second input end IN2, into which direct-current power supply voltages are input, and a first output end OUT1 and a second output end OUT2, from which alternating-current voltages are output. Direct-current voltages generated by, for example, a solar power generation panel are applied to the first input end IN1 and the second input end IN1. In FIG. 1, Su and Sw indicate a single-phase three-wire system having a U-phase and a W-phase. An alternating-current voltage whose effective voltage preferably is about 100 V, for example, is applied between the first output end OUT1 and a neutral point NP, an alternating-current voltage whose effective voltage preferably is about 100 V, for example, is applied between the neutral point NP and the second output end OUT2, and an alternating-current voltage whose effective voltage preferably is about 200 V, for example, is applied between the first output end OUT1 and the second output end.

A first three-level circuit 121 is connected between the first input end IN1 and a ground, and a second three-level circuit 122 is connected between the second input end IN2 and the ground.

A bridge clamping circuit 130 is connected between the first three-level circuit 121 and the second three-level circuit 122.

A first inductor L1 is connected between the first output end OUT1 and a connection point between a first subsequent-stage switch element S1U and a second subsequent-stage switch element S2U in the bridge clamping circuit 130. A second inductor L2 is connected between the second output end OUT2 and a connection point between a third subsequent-stage switch element S1W and a fourth subsequent-stage switch element S2W in the bridge clamping circuit 130.

As a result of the two three-level circuits 121 and 122, a preceding-stage switching circuit 120 is provided. Accordingly, the bridge clamping circuit 130 may also be called a "subsequent-stage switching circuit".

Each of the first three-level circuit 121 and the second three-level circuit 122 outputs an electric potential falling within a range from an input electric potential on a high (H) side to an input electric potential on a low (L) side. Vdc/2 is applied to the first input end IN1, and −Vdc/2 is applied to the second input end IN1. Accordingly, as for the first three-level circuit 121, since the electric potential on the high (H) side is Vdc/2 and the electric potential on the low (L) side is 0, the electric potential of the output end of the first three-level circuit 121 ranges from Vdc/2 to 0. In addition, as for the second three-level circuit 122, since the electric potential on the high (H) side is 0 and the electric potential on the low (L) side is −Vdc/2, the electric potential of the output end of the second three-level circuit 122 ranges from 0 to −Vdc/2. Accordingly, as a result of the first three-level circuit 121 and the second three-level circuit 122, the preceding-stage switching circuit 120 defines and functions as a five-level circuit performing voltage conversion using five voltage levels.

The bridge clamping circuit 130 switches between a state (first state) where the output of the first three-level circuit 121 is connected (clamped) to the first output end OUT1 through the inductor L1 and the output of the second three-level circuit 122 is connected (clamped) to the second output end OUT2 through the inductor L2 and a state (second state) where the output of the first three-level circuit 121 is connected (clamped) to the second output end OUT2 through the inductor L2 and the output of the second three-level circuit 122 is connected (clamped) to the first output end OUT1 through the inductor L1. The first state corresponds to the anterior half cycle of the power supply frequency of a system, and the second state corresponds to the posterior half cycle of the power supply frequency of the system.

Figure 2:
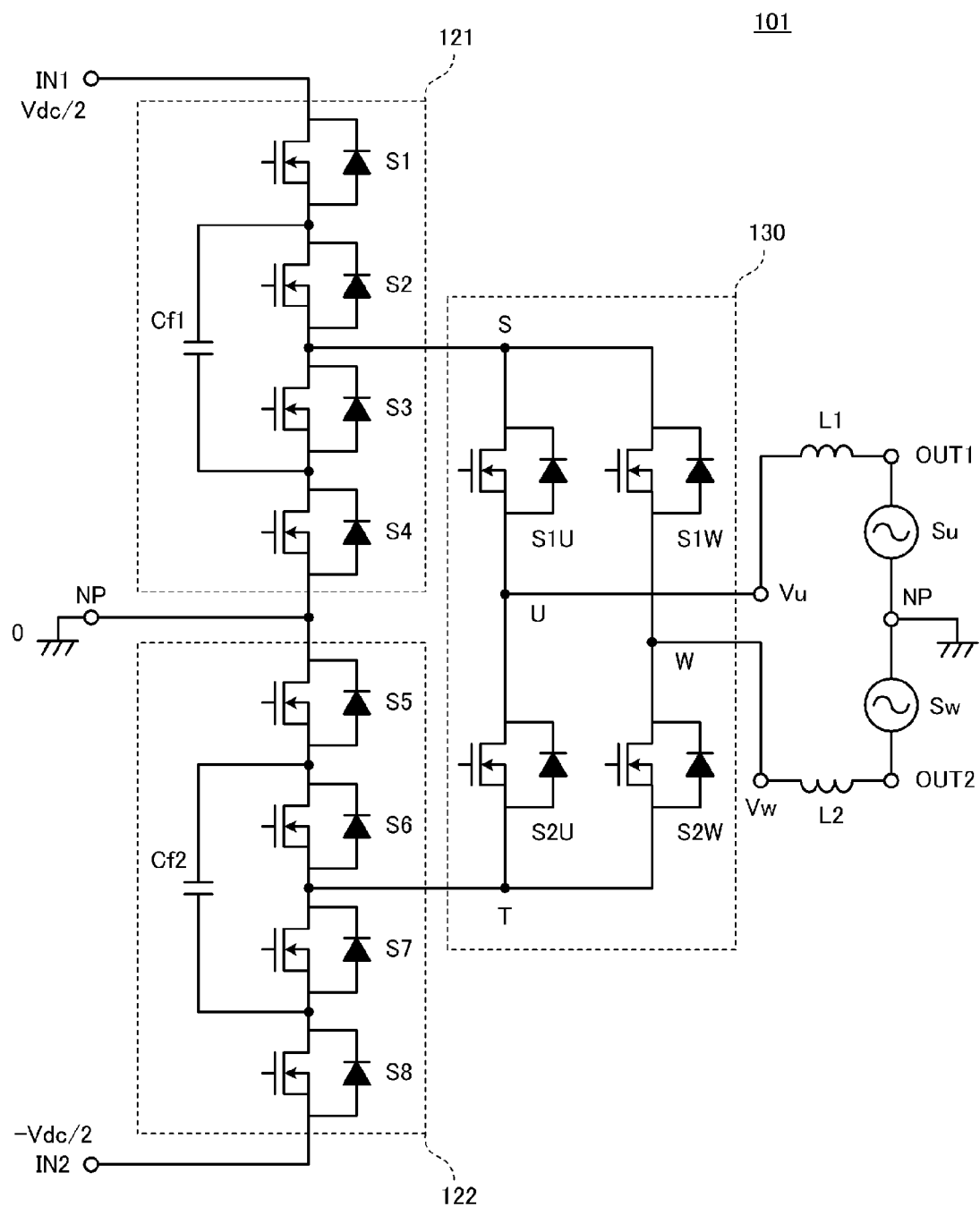
FIG. 2 is a circuit diagram of the inverter device of FIG. 1.

FIG. 2 is the circuit diagram of the inverter device 101. The first three-level circuit 121 includes first, second, third and fourth preceding-stage switch elements (S1 to S4) connected in series between the first input end IN1 and the ground and a first charging and discharging capacitor (Cf1) including a first end that is connected to a connection point between the first preceding-stage switch element S1 and the second preceding-stage switch element S2 and a second end that is connected to a connection point between the third preceding-stage switch element S3 and the fourth preceding-stage switch element S4. In addition, the second three-level circuit 122 includes fifth, sixth, seventh, and eighth preceding-stage switch elements (S5 to S8) connected in series between the second input end IN2 and the ground and a second charging and discharging capacitor (Cf2) including a first end that is connected to a connection point between the fifth preceding-stage switch element S5 and the sixth preceding-stage switch element S6 and a second end that is connected to a connection point between the seventh preceding-stage switch element S7 and the eighth preceding-stage switch element S8.

The bridge clamping circuit 130 includes first, second, third and fourth subsequent-stage switch elements S1U, S2U, S1W, and S2W bridge-connected to first, second, third and fourth terminals S, T, U, and W. The first terminal S is connected to a connection point between the second preceding-stage switch element S2 and the third preceding-stage switch element S3, and the second terminal T is connected to a connection point between the sixth preceding-stage switch element S6 and the seventh preceding-stage switch element S7. In addition, the third terminal U is connected to a connection point between the first subsequent-stage switch element S1U and the second subsequent-stage switch element S2U, and the fourth terminal W is connected to a connection point between the third subsequent-stage switch element S1W and the fourth subsequent-stage switch element S2W.

Each of the eight preceding-stage switch elements S1 to S8 and the four subsequent-stage switch elements S1U, S2U, S1W, and S2W preferably is a MOS-FET, and body diodes are also illustrated in FIG. 2, for example. Since the three-level circuits 121 and 122 are connected in series, it is possible to use a low-voltage switch element for each of the eight switch elements S1 to S8. Therefore, it is possible to configure the eight preceding-stage switch elements S1 to S8 preferably using the MOS-FETs without using Insulated Gate Bipolar Transistors (IGBTs), and it is also possible to reduce the costs thereof.

Figure 3:
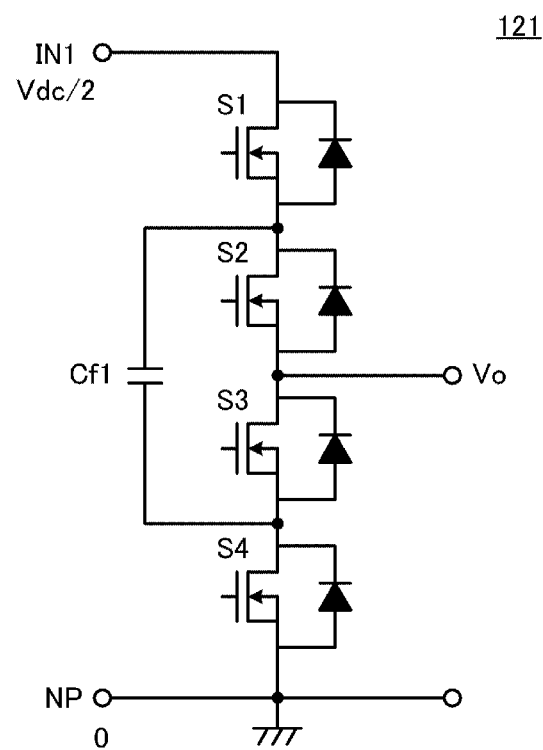
FIG. 3 is a circuit diagram of a first three-level circuit.

FIG. 3 is the circuit diagram of the first three-level circuit 121, and FIG. 4 is a diagram illustrating a relationship between the states of the four switch elements S1 to S4 therein and an output voltage (electric potential) Vo. Here, the four switch elements S1 to S4 may be put into four states H, Mc, Md, and L.

Figure 5:
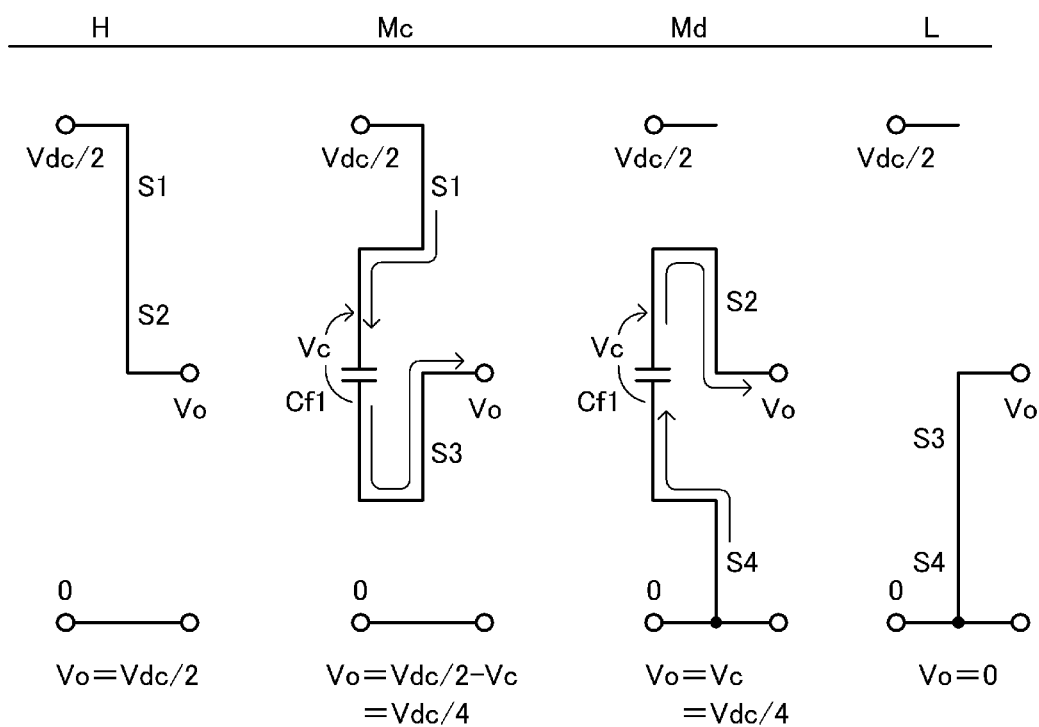
FIG. 5 illustrates equivalent circuit diagrams of the first three-level circuit in four states.

FIG. 5 illustrates the equivalent circuit diagrams of the first three-level circuit 121 in the four states. In the state H, since the switch elements S1 and S2 are turned on (ON) and the switch elements S3 and S4 are turned off (OFF), the output voltage Vo is Vdc/2. In the state L, since the switch elements S3 and S4 are turned on (ON) and the switch elements S1 and S2 are turned off (OFF), the output voltage Vo is 0. In the state Mc, since the switch elements S1 and S3 are turned on (ON) and the switch elements S2 and S4 are turned off (OFF), the output voltage Vo is Vdc/2 −Vc. Here, the Vc is the charging voltage of the first charging and discharging capacitor Cf1. When it is assumed that Vc=Vdc/4 is satisfied, the output voltage Vo=Vdc/4 is satisfied. In the state Md, since the switch elements S2 and S4 are turned on (ON) and the switch elements S1 and S3 are turned off (OFF), the output voltage Vo is Vc. Here, when it is assumed that Vc=Vdc/4 is satisfied, the output voltage Vo=Vdc/4 is satisfied. Since the charging charge amount and the discharging charge amount of the first charging and discharging capacitor Cf1 may be deemed to be equal to each other, the output voltage Vo in the state Mc and the output voltage Vo in the state Md are equal to each other. In other words, the charging voltage Vc of the first charging and discharging capacitor Cf1 is charged and discharged with centering on Vdc/4 serving as a half of Vdc/2. If a charging and discharging time constant for the first charging and discharging capacitor Cf1 is sufficiently large with respect to a switching frequency, the fluctuation range of the charging voltage Vc is small, and it may be possible to be deemed as Vc≈Vdc/4. The fluctuation of the output voltage Vo due to the charge and discharge of the first charging and discharging capacitor Cf1 will be described later.

Figure 6:
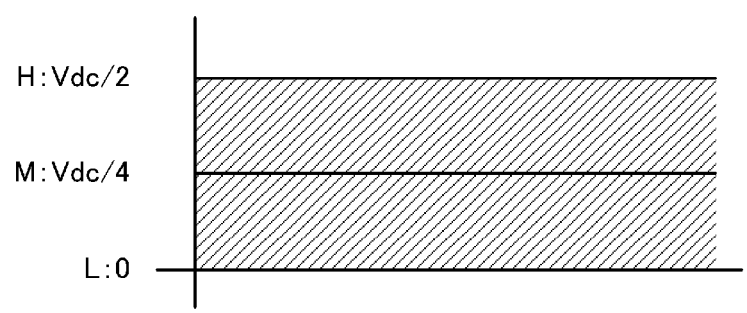
FIG. 6 is a diagram illustrating a range of a voltage capable of being obtained on the basis of an output voltage of the first three-level circuit.

FIG. 6 is a diagram illustrating the range of a voltage capable of being obtained on the basis of the output voltage of the first three-level circuit 121. As described above, as a result of the switching of the four switch elements S1 to S4, the four states H, Mc, Md, and L are selected, and hence it is possible to output a voltage in the range of Vdc/2 to 0.

Figure 7:
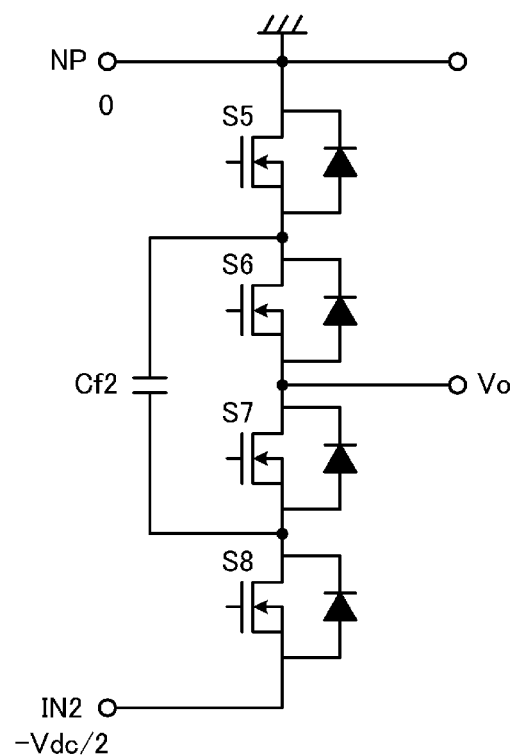
FIG. 7 is a circuit diagram of a second three-level circuit.

FIG. 7 is the circuit diagram of the second three-level circuit 122, and FIG. 8 is a diagram illustrating a relationship between the states of the four switch elements S5 to S8 therein and an output voltage (electric potential) Vo. Here, the four switch elements S5 to S8 may be put into four states H, Mc, Md, and L.

Figure 9:
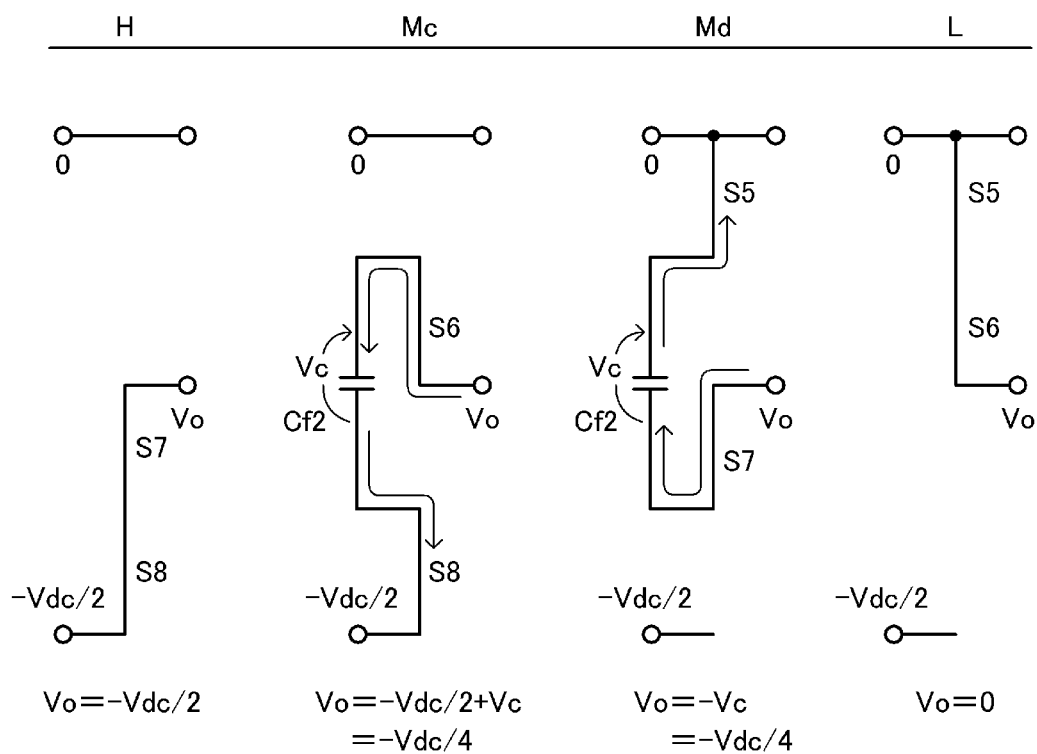
FIG. 9 illustrates equivalent circuit diagrams of the second three-level circuit in four states.

FIG. 9 illustrates the equivalent circuit diagrams of the second three-level circuit 122 in the four states. In the state H, since the switch elements S7 and S8 are turned on (ON) and the switch elements S5 and S6 are turned off (OFF), the output voltage Vo is −Vdc/2. In the state L, since the switch elements S5 and S6 are turned on (ON) and the switch elements S7 and S8 are turned off (OFF), the output voltage Vo is 0. In the state Mc, since the switch elements S6 and S8 are turned on (ON) and the switch elements S5 and S7 are turned off (OFF), the output voltage Vo is −Vdc/2+Vc. Here, the Vc is the charging voltage of the second charging and discharging capacitor Cf2. When it is assumed that Vc=Vdc/4 is satisfied, the output voltage Vo=−Vdc/4 is satisfied. In the state Md, since the switch elements S5 and S7 are turned on (ON) and the switch elements S6 and S8 are turned off (OFF), the output voltage Vo is −Vc. Here, when it is assumed that Vc=Vdc/4 is satisfied, the output voltage Vo=−Vdc/4 is satisfied. Since the charging charge amount and the discharging charge amount of the second charging and discharging capacitor Cf2 may be deemed to be equal to each other, the output voltage Vo in the state Mc and the output voltage Vo in the state Md are equal to each other. In other words, the charging voltage Vc of the second charging and discharging capacitor Cf2 is charged and discharged with centering on Vdc/4 serving as a half of Vdc/2. If a charging and discharging time constant for the second charging and discharging capacitor Cf2 is sufficiently large with respect to a switching frequency, the fluctuation range of the charging voltage Vc is small, and it may be possible to be deemed as Vc≈Vdc/4.

Figure 10:
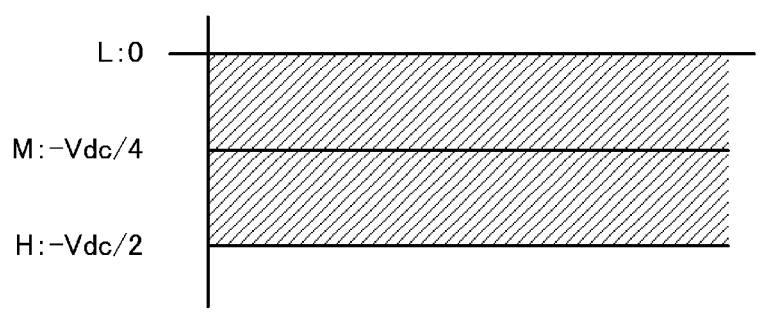
FIG. 10 is a diagram illustrating a range of a voltage capable of being obtained on the basis of an output voltage of the second three-level circuit.

FIG. 10 is a diagram illustrating the range of a voltage capable of being obtained on the basis of the output voltage of the second three-level circuit 122. As described above, as a result of the switching of the four switch elements S5 to S8, the four states H, Mc, Md, and L are selected, and hence it is possible to output a voltage in the range of 0 to −Vdc/2.

Figure 11:
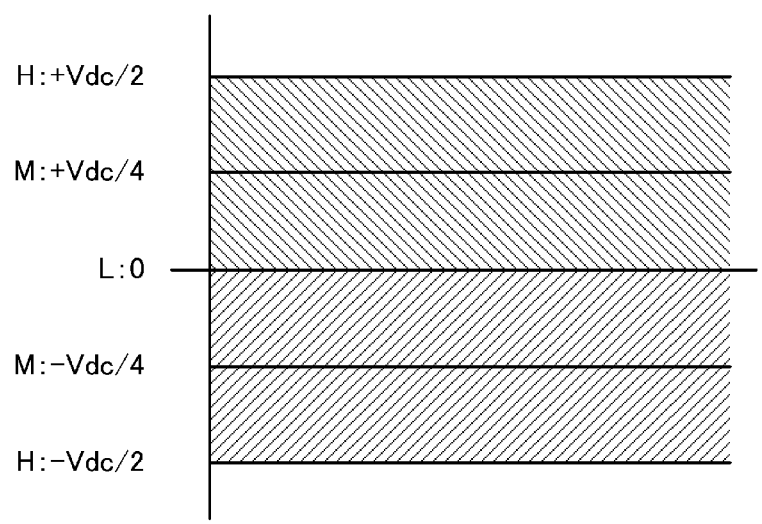
FIG. 11 is a diagram illustrating a range of a voltage capable of being obtained on the basis of voltages output from the first three-level circuit and the second three-level circuit.
Figure 13A:
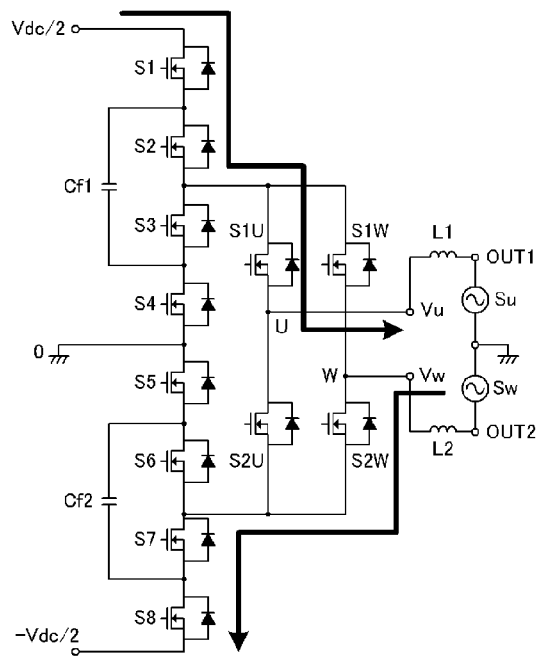
FIGS. 13A to 13D are diagrams illustrating current paths in states illustrated in FIG. 12.
Figure 13B:
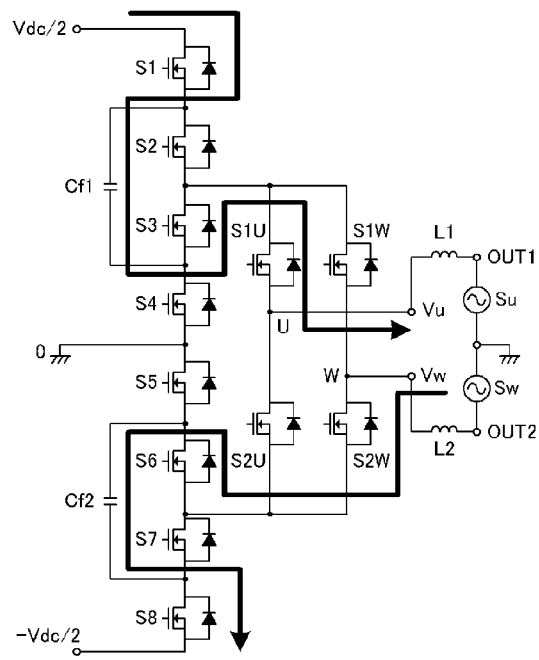
Figure 13C:
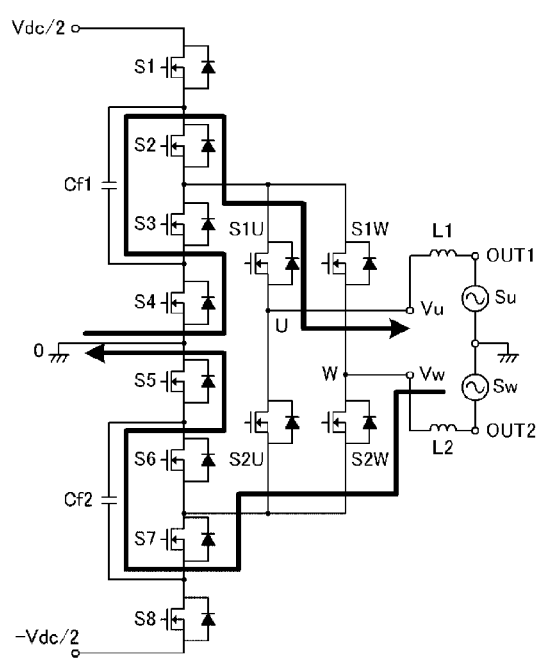
Figure 13D:
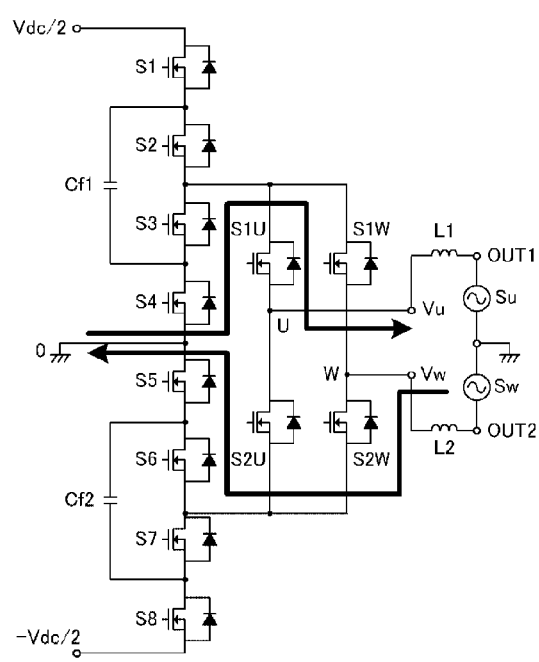
Figure 14A:
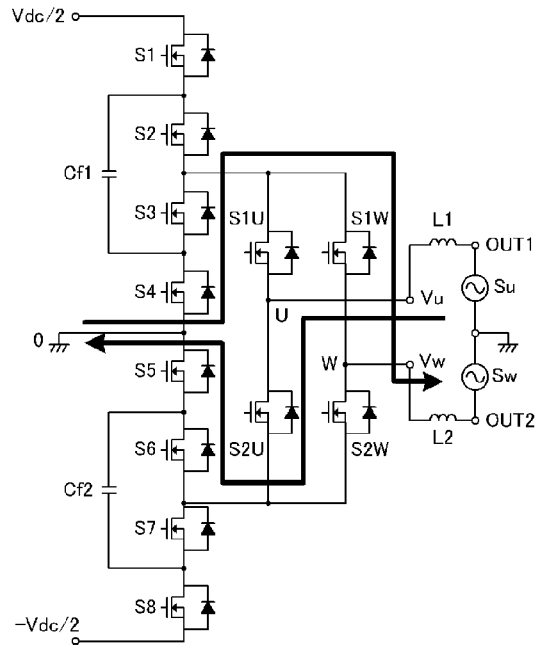
FIGS. 14A to 14D are diagrams illustrating current paths in states illustrated in FIG. 12.
Figure 14B:
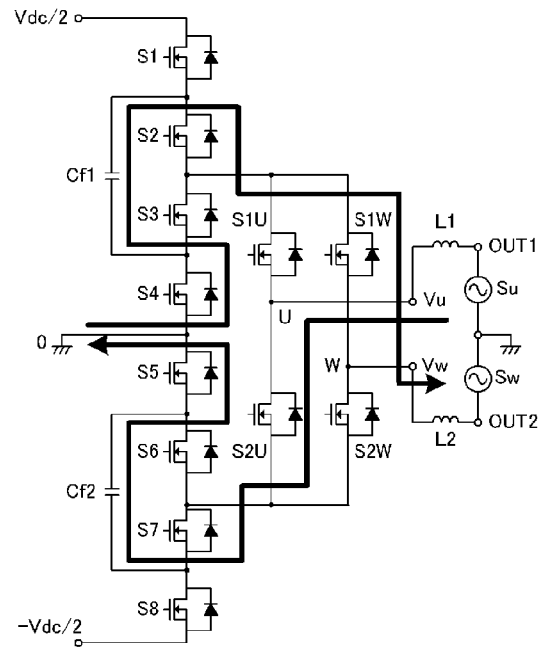
Figure 14C:
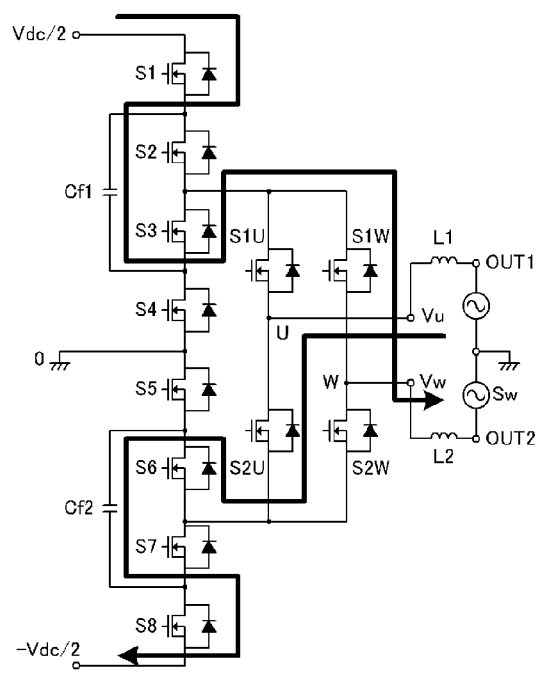
Figure 14D:
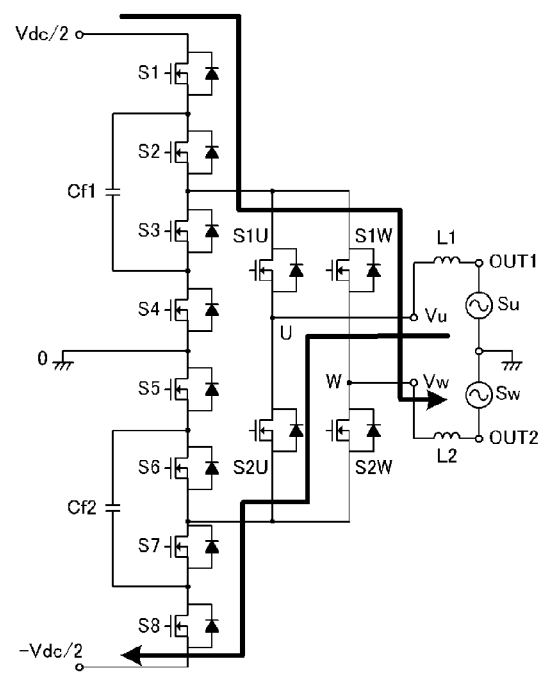

FIG. 11 is a diagram illustrating the range of a voltage capable of being obtained on the basis of voltages output from the first three-level circuit 121 and the second three-level circuit 122. In this way, the first three-level circuit 121 and the second three-level circuit 122 define a five-level circuit.

FIG. 12 is a diagram illustrating a relationship among the states of the eight preceding-stage switch elements S1 to S8, the states of the four subsequent-stage switch elements S1U, S2U, S1W, and S2W, and the instantaneous values of the output voltages Vu and Vw (refer to FIG. 2). FIGS. 13A to 13D and FIGS. 14A to 14D are diagrams illustrating current paths in eight states CP1 to CP8 illustrated in FIG. 12. The states CP1 and CP8 correspond to the states H in FIG. 5 and FIG. 9, the states CP2 and CP7 correspond to the states Mc in FIG. 5 and FIG. 9, the states CP3 states CP4 and CP5 correspond to the states L in FIG. 5 and FIG. 9.

While the instantaneous values of the output voltages Vu and Vw are any of five levels of Vdc/2, Vdc/4, 0, −Vdc/4, and −Vdc/2, the eight preceding-stage switch elements S1 to S8 are preferably subjected to PWM control using, for example, a carrier frequency of about 20 kHz so that a current injected into the system becomes a half wave of a substantially sinusoidal wave. In addition, since the output polarities of the four subsequent-stage switch elements S1U, S2U, S1W, and S2W are inverted between the anterior half cycle and the posterior half cycle of the power supply frequency (about 50 Hz or about 60 Hz, for example) of the system, a substantially sinusoidal wave-like current is eventually injected into the system.

Figure 15:
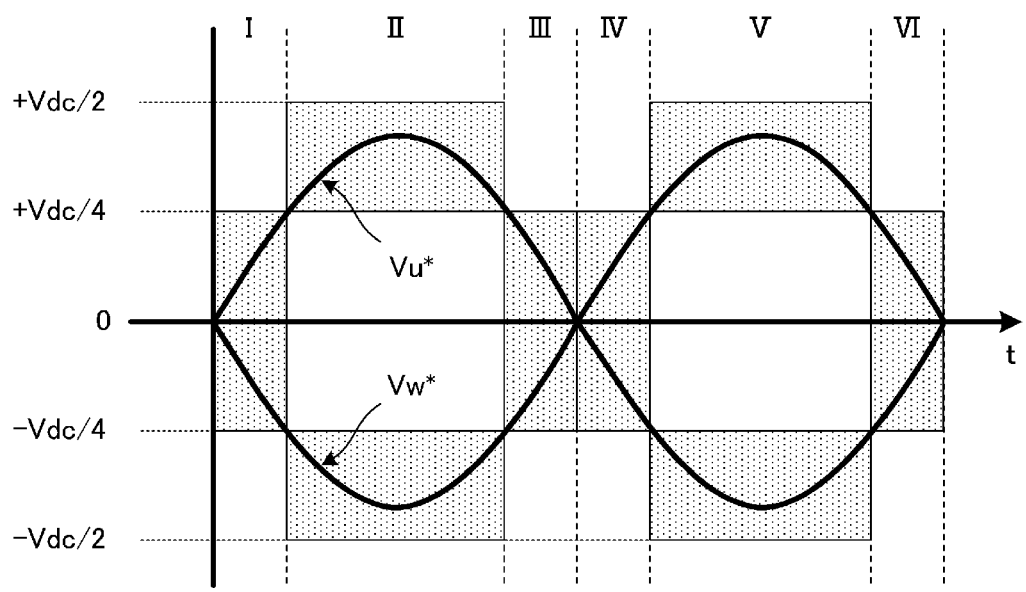
FIG. 15 is a diagram illustrating a relationship among voltages of five levels, a target value of an output voltage, and a target value of an output voltage.

FIG. 15 is a diagram illustrating a relationship among the voltages of the five levels, the target value Vu* of the output voltage Vu, and the target value Vw* of the output voltage Vw, and FIG. 16 is a diagram illustrating a relationship among time divisions and voltage divisions in FIG. 15 and switching patterns. A range filled with gray in FIG. 15 indicates a range within which a voltage may fall.

As is clear from these drawings, when the target value Vu* of the output voltage Vu falls within the range of 0 to Vdc/4, a state transition where a state transits in the order of CP4 →CP2 →CP4 →CP3 →CP4 →CP2 → . . . from among the four states illustrated in FIGS. 13A to 13D is eventually repeated based on the PWM control. In addition, when the target value Vu* of the output voltage Vu falls within the range of Vdc/4 to Vdc/2, a state transition where a state transits in the order of CP1 →CP2 →CP1 →CP3 →CP1 →CP2 → . . . from among the four states illustrated in FIGS. 13A to 13D is eventually repeated based on the PWM control. In addition, when the target value Vu* of the output voltage Vu falls within the range of 0 to −Vdc/4, a state transition where a state transits in the order of CP5 →CP6 →CP5 →CP7 →CP5 → CP6 → . . . from among the four states illustrated in FIGS. 14A to 14D is eventually repeated based on the PWM control. In addition, when the target value Vu* of the output voltage Vu falls within the range of −Vdc/4 to −Vdc/2, a state transition where a state transits in the order of CP8 →CP6 → CP8 →CP7 →CP8 →C6 → . . . from among the four states illustrated in FIGS. 14A to 14D is eventually repeated based on the PWM control.

Also as for the target value Vw* of the output voltage Vw, a state transition according to the switching patterns illustrated in FIG. 15 and FIG. 16 is repeated based on the PWM control.

Figure 17A:
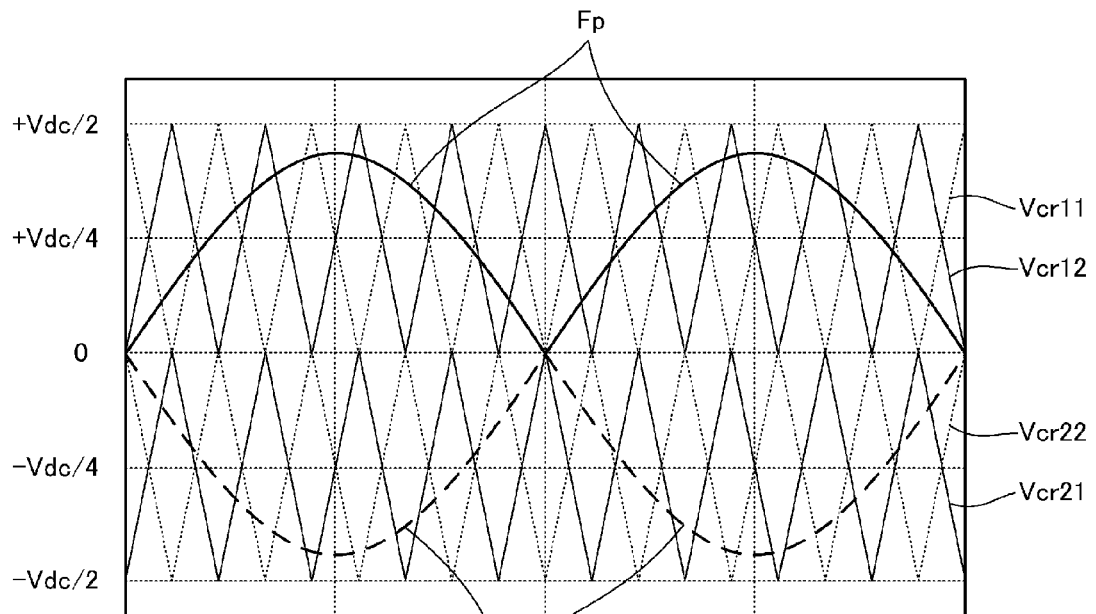
FIGS. 17A and 17B illustrate waveform diagrams of a PWM-modulated voltage and a target value when PWM control is performed with respect to the output voltage.
Figure 17B:
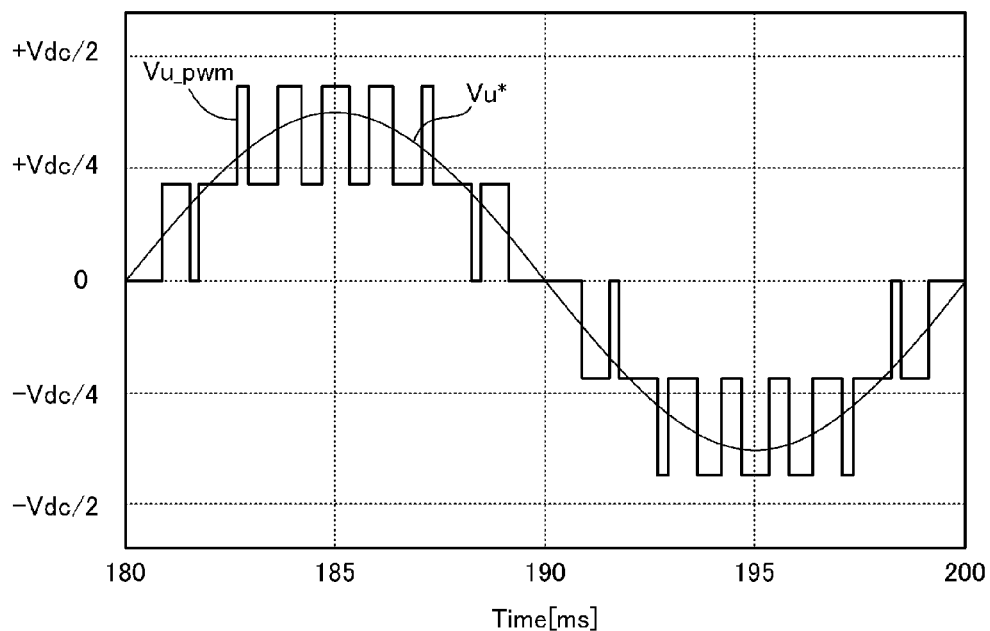

FIGS. 17A and 17B illustrate waveform diagrams of a PWM-modulated voltage Vu_pwm and the target value Vu* when the PWM control is performed with respect to the output voltage Vu. Here, substantially triangular waves Vcr11 and Vcr12 are reference voltage waveforms used for PWM modulation when the output voltage falls within the range of 0 to Vdc/2. In addition, substantially triangular waves Vcr21 and Vcr22 are reference voltage waveforms used for PWM modulation when the output voltage falls within the range of 0 to −Vdc/2. A signal Fp is a half-cycle signal of the target value Vu*, and a signal Fn is a half-cycle signal of the target value Vw*.

In this way, when the target voltage Vu* falls within the range of 0 to Vdc/4, the PWM modulation is performed using two values of 0 and Vdc/4, and when the target voltage Vu* falls within the range of Vdc/4 to Vdc/2, the PWM modulation is performed using two values of Vdc/4 and Vdc/2. In the same way, when the target voltage Vu* falls within the range of 0 to −Vdc/4, the PWM modulation is performed using two values of 0 and −Vdc/4, and when the target voltage Vu* falls within the range of −Vdc/4 to −Vdc/2, the PWM modulation is performed using two values of −Vdc/4 and −Vdc/2.

In this way, since a substantially sinusoidal voltage is generated based on the PWM modulation using a plurality of voltage levels, ripple currents flowing through the inductors L1 and L2 become small and losses due to the inductors L1 and L2 are significantly reduced and prevented. Therefore, it is possible to use the small inductors L1 and L2.

Figure 18:
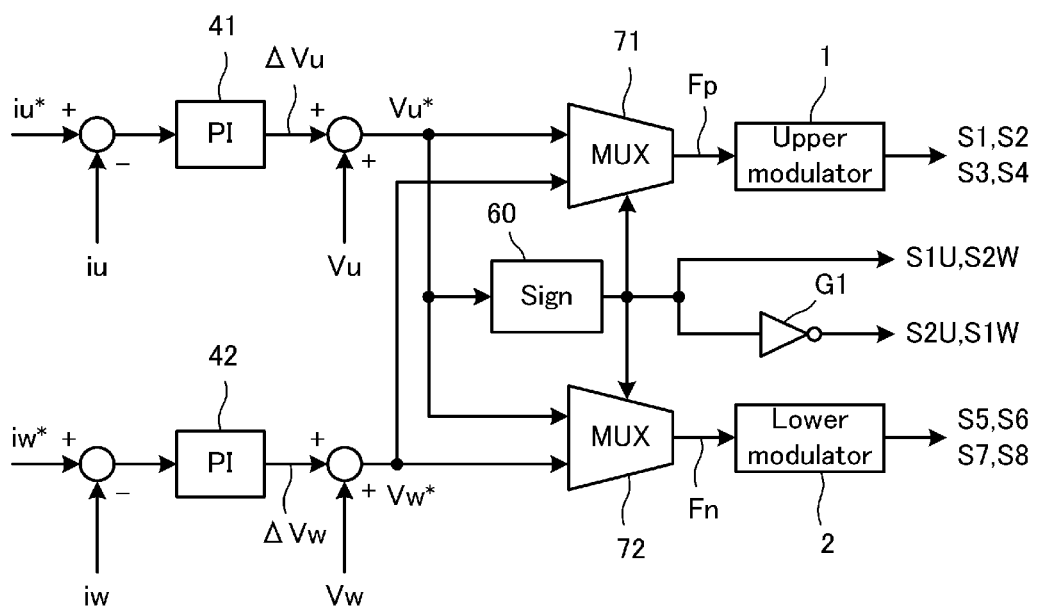
FIG. 18 is a block diagram of a drive control circuit generating gate signals of the eight preceding-stage switch elements and the four subsequent-stage switch elements, illustrated in FIG. 2.

FIG. 18 is the block diagram of the drive control circuit 201 generating the gate signals of the eight preceding-stage switch elements S1 to S8 and the four subsequent-stage switch elements S1U, S2U, S1W, and S2W, illustrated in FIG. 2. In FIG. 18, the meaning of each signal is as follows:

iu*: the target value of the output current of the U-phase;
iw*: the target value of the output current of the W-phase;
iu: the detection value of the output current of the U-phase;
iw: the detection value of the output current of the W-phase;
Vu*: the voltage target value of the U-phase;
Vw*: the voltage target value of the W-phase;
Vu: the voltage detection value of the U-phase;
Vw: the voltage detection value of the W-phase;
ΔVu: the voltage correction value of the U-phase;
ΔVw: the voltage correction value of the W-phase;
Fp: the input signal of the first modulation circuit (a positive full-wave rectified waveform); and
Fn: the input signal of the second modulation circuit (a negative full-wave rectified waveform).

Thus, the drive control circuit 201 and the inverter device 101 illustrated in FIG. 2 provide a power-system-interconnected inverter device.

In FIG. 18, on the basis of a current error (iu*−iu) of the U-phase, a PI control circuit 41 obtains a voltage correction value ΔVu in a direction reducing the current error (iu*−iu), due to a PI operation. On the basis of a current error (iw*−iw) of the W-phase, a PI control circuit 42 obtains a voltage correction value ΔVw in a direction reducing the current error (iw*−iw), due to a PI operation.

A multiplexer 71 provides a first modulation circuit 1 with one of the voltage target value Vu* corrected by the voltage correction value ΔVu being added to the voltage detection value Vu of the U-phase and the voltage target value Vw* corrected by the voltage correction value ΔVw being added to the voltage detection value Vw of the W-phase. In the same way, a multiplexer 72 provides a second modulation circuit 2 with one of the voltage target values Vu* and Vw*.

A sign circuit 60 detects the sign of the voltage target value Vu* of the U-phase, and the multiplexers 71 and 72 select the voltage target value Vu* or the voltage target value Vw* in response to the sign (plus or minus) of the voltage target value Vu*.

In addition, the sign circuit 60 provides the subsequent-stage switch elements S1U and S2W with the gate signals. A NOT circuit G1 inverts the output signal of the sign circuit 60, and provides the subsequent-stage switch elements S2U and S1W with the gate signals.

Figure 19A:
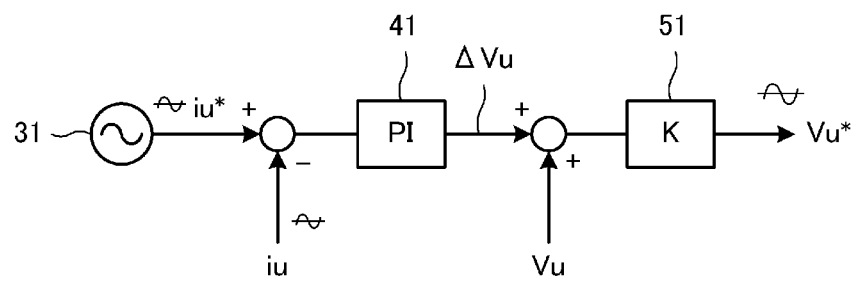
FIGS. 19A and 19B are diagrams illustrating detailed configurations of generation circuit units for the voltage target values in the drive control circuit illustrated in FIG. 18.
Figure 19B:
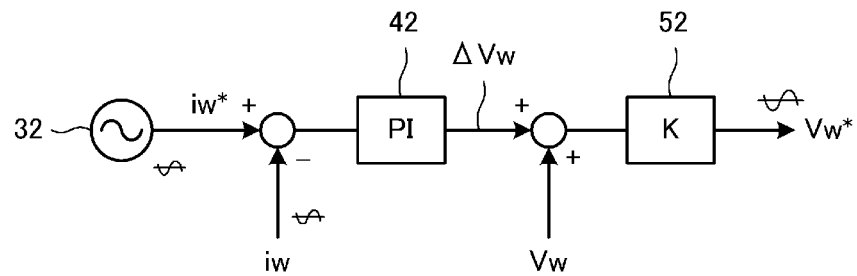

FIGS. 19A and 19B are diagrams illustrating the detailed configurations of generation circuit units for the voltage target values Vu* and Vw* in the drive control circuit 201 illustrated in FIG. 18. A sinusoidal wave generation circuit 31 generates the signal (substantially sinusoidal wave) of the target value iu* of the output current of the U-phase. A sinusoidal wave generation circuit 32 generates the signal (substantially sinusoidal wave) of the target value iw* of the output current of the W-phase. These substantially sinusoidal waves are signals with phases equal to (synchronized with) the voltage phase of the system. As described above, on the basis of the current error (iu*−iu) of the U-phase, the PI control circuit 41 obtains the voltage correction value ΔVu in a direction reducing the current error (iu*−iu), due to the PI operation. On the basis of the current error (iw*−iw) of the W-phase, the PI control circuit 42 obtains the voltage correction value ΔVw in a direction reducing the current error (iw*−iw), due to the PI operation. A coefficient circuit 51 multiplies (Vu +ΔVu) by a predetermined coefficient and generates the voltage target value Vu*. A coefficient circuit 52 multiplies (Vw+ΔVw) by a predetermined coefficient and generates the voltage target value Vw*. These coefficients are defined in accordance with feedback gains.

Figure 20:
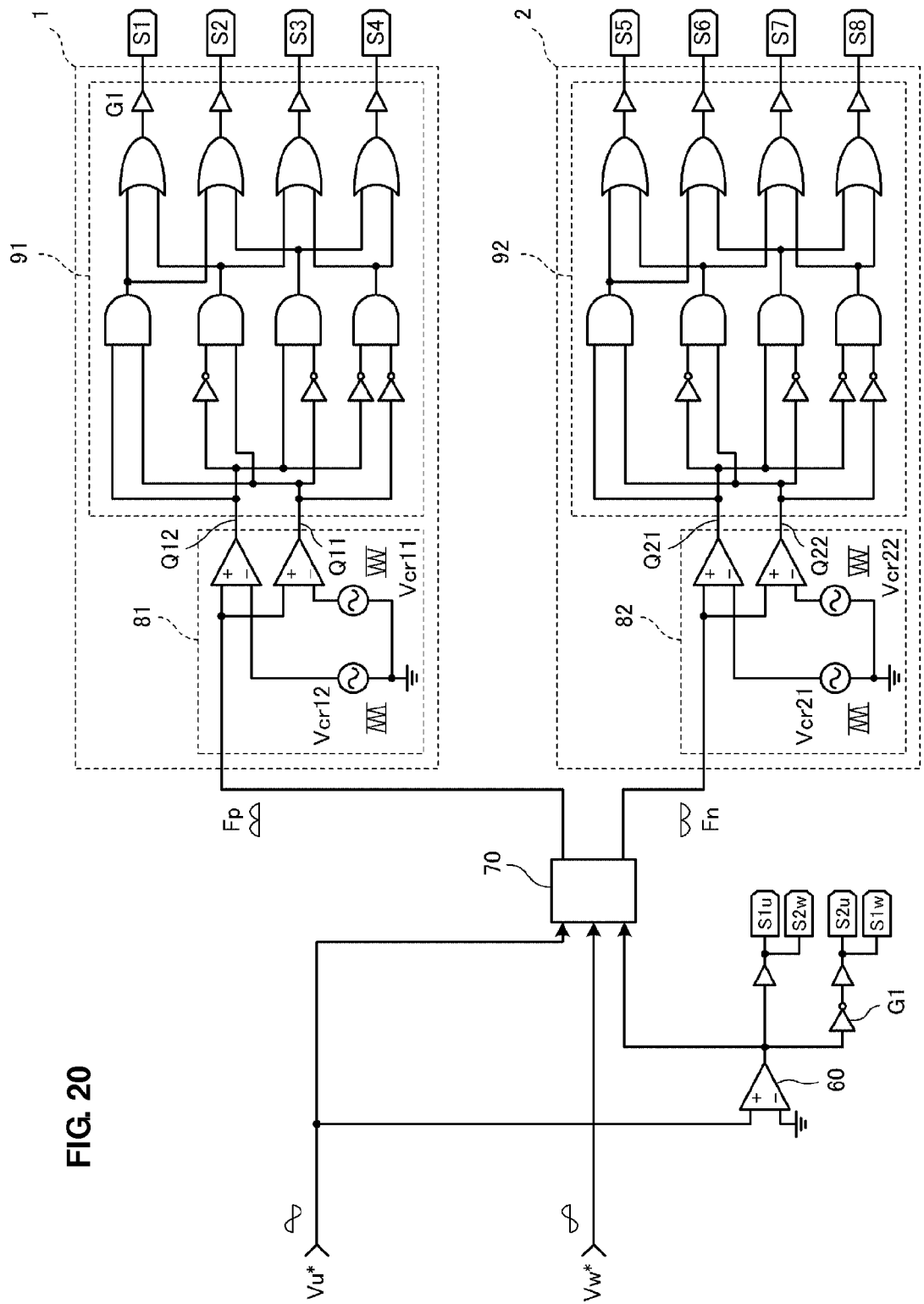
FIG. 20 is a detailed circuit diagram of a circuit portion generating the gate signals of the eight preceding-stage switch elements and the four subsequent-stage switch elements on the basis of the voltage target values.

FIG. 20 is the detailed circuit diagram of a circuit portion generating the gate signals of the eight preceding-stage switch elements S1 to S8 and the four subsequent-stage switch elements S1U, S2U, S1W, and S2W on the basis of the voltage target values Vu* and Vw*. The sign circuit 60 is a comparator, and outputs a signal having a high level when the voltage target value Vu* is positive. This signal turns out to be gate signals for the subsequent-stage switch elements S1U and S2W. In addition, a signal inverted in the NOT circuit G1 turns out to be gate signals for the subsequent-stage switch elements S2U and S1W.

A multiplexer 70 corresponds to the multiplexers 71 and 72 illustrated in FIG. 18. In response to the output value of the sign circuit 60, the multiplexer 70 selectively provides the first modulation circuit 1 and the second modulation circuit 2 with the voltage target values Vu* and Vw*. The positive half-cycle signal (a signal looking like a positive full-wave rectified waveform) Fp is provided to the first modulation circuit 1, and the negative half-cycle signal (a signal looking like a negative full-wave rectified waveform) Fn is provided to the second modulation circuit 2.

Figure 21:
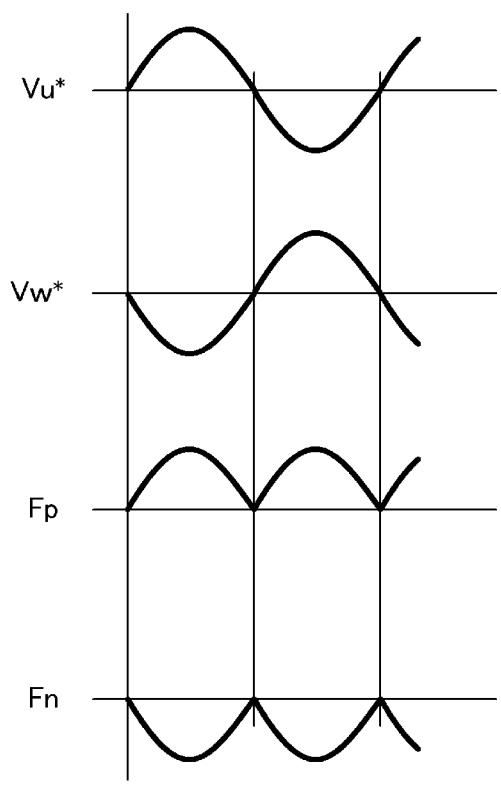
FIG. 21 illustrates waveforms of the voltage target values and waveforms of the half-cycle signals thereof.
Figure 22A:
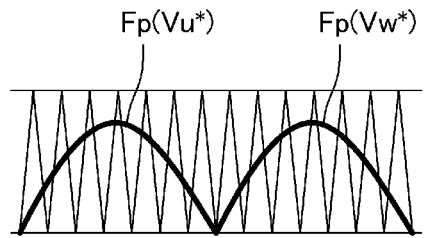
FIGS. 22A to 22D illustrate waveforms of substantially triangular waves input to comparators and waveforms of the half-cycle signals.
Figure 22B:
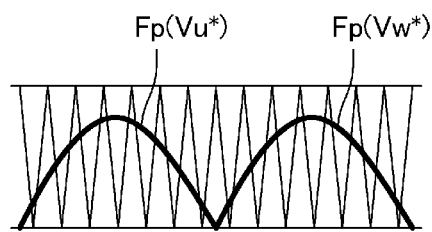
Figure 22C:
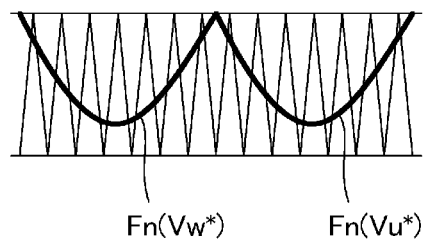
Figure 22D:
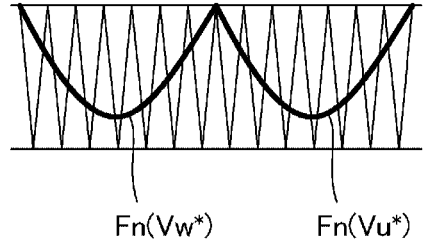
Figure 26A:
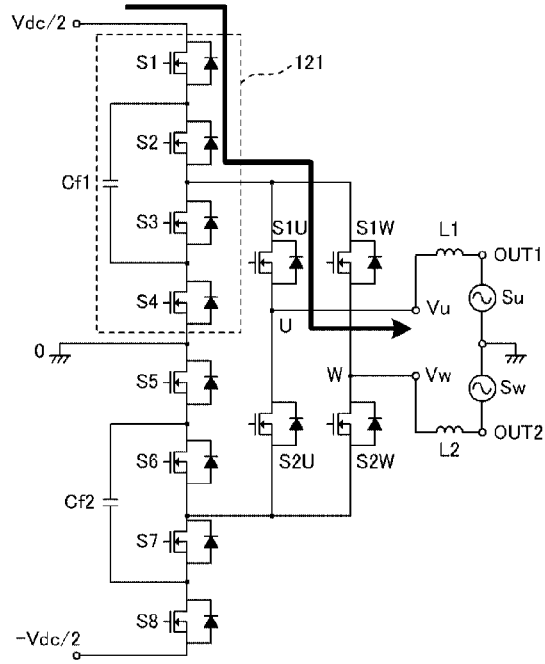
FIGS. 26A to 26D are diagrams illustrating current paths in the four states illustrated in FIG. 24A.
Figure 26B:
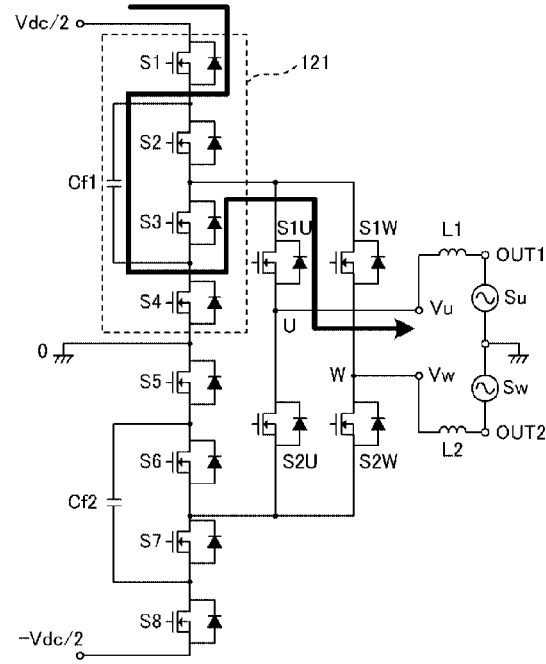
Figure 26C:
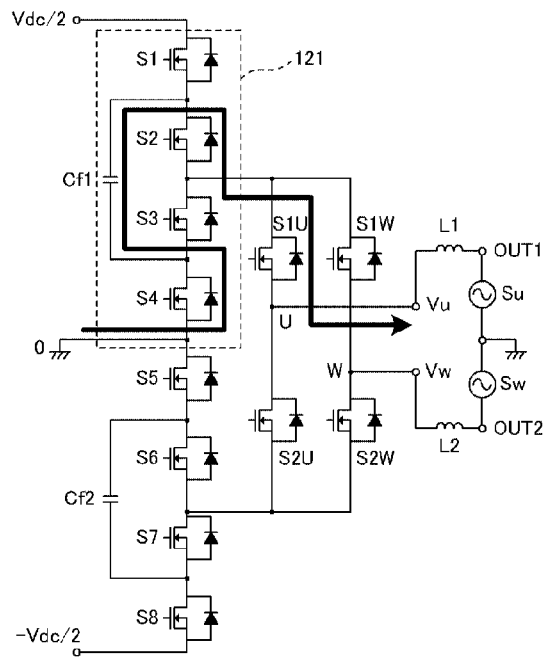
Figure 26D:
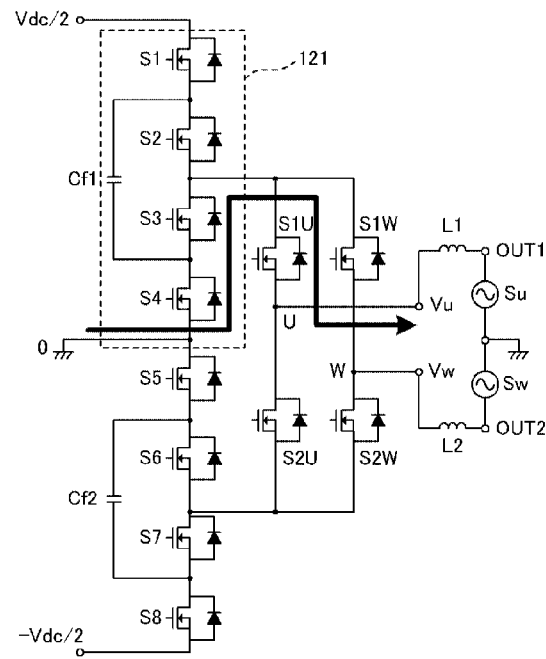
Figure 27A:
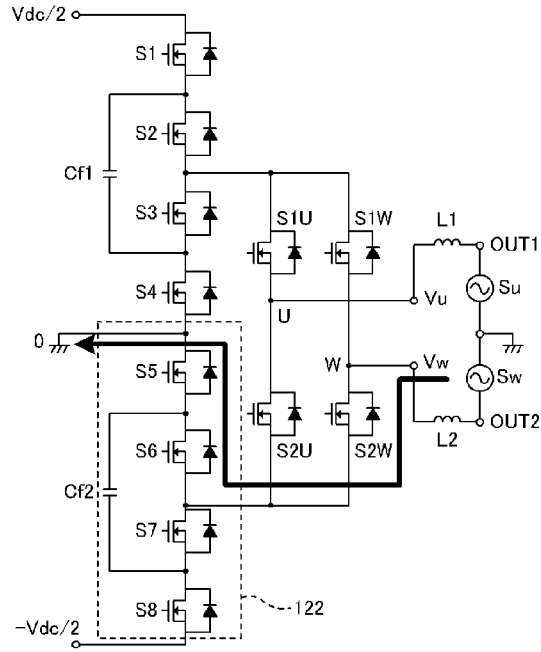
FIGS. 27A to 27D are diagrams illustrating current paths in the four states illustrated in FIG. 24B.
Figure 27B:
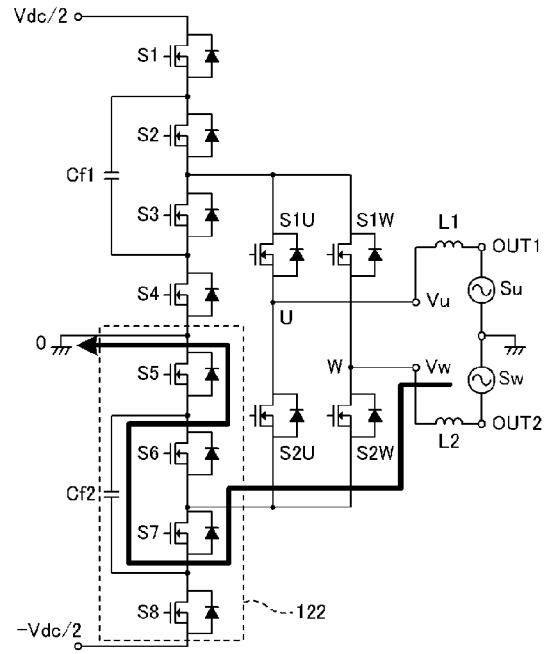
Figure 27C:
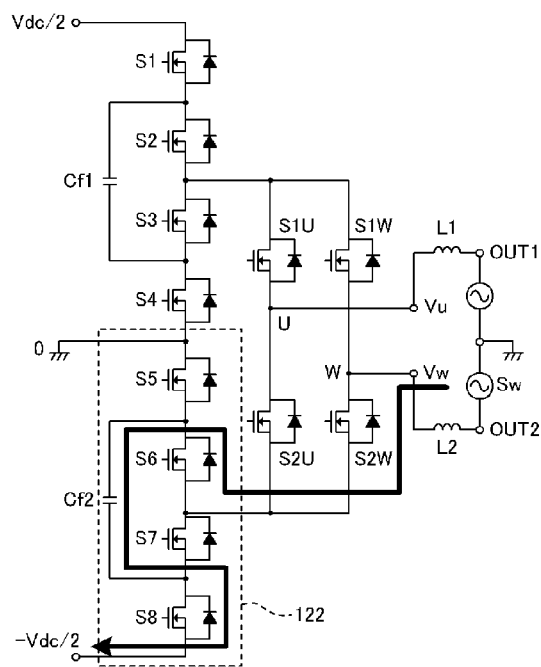
Figure 27D:
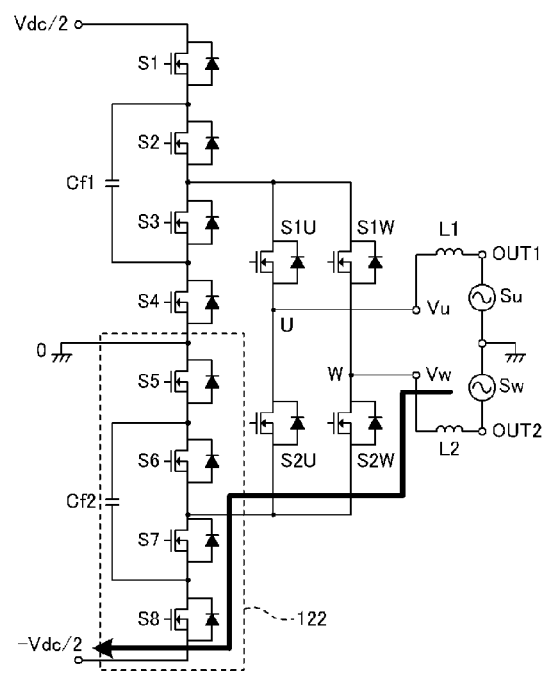

FIG. 21 illustrates the waveforms of the voltage target values Vu* and Vw* and the waveforms of the half-cycle signals Fp and Fn thereof.

The first modulation circuit 1 illustrated in FIG. 20 includes a PWM modulation circuit 81 and a switch element drive circuit 91, and the second modulation circuit 2 includes a PWM modulation circuit 82 and a switch element drive circuit 92. The PWM modulation circuit 81 provides the switch element drive circuit 91 with a signal obtained by modulating the positive half-cycle signal Fp output from the multiplexer 70, using a substantially triangular wave. The PWM modulation circuit 82 provides the switch element drive circuit 92 with a signal obtained by modulating the negative half-cycle signal Fn output from the multiplexer 70, using a substantially triangular wave.

The PWM modulation circuit 81 includes generation circuits for the two substantially triangular waves Vcr11 and Vcr12 and two comparators. The PWM modulation circuit 82 includes generation circuits for the two substantially triangular waves Vcr21 and Vcr22 and two comparators.

FIGS. 22A to 22D illustrate the waveforms of the substantially triangular waves Vcr11, Vcr12, Vcr21, and Vcr22 input to the comparators and the waveforms of the half-cycle signals Fp and Fn.

FIGS. 23A and 23B are diagrams illustrating the output signals Q11, Q12, Q21, and Q22 of the PWM modulation circuits 81 and 82 and the states of the switch elements S1 to S8 due to the output signals of the switch element drive circuits 91 and 92.

With such a circuit as illustrated above, in the same way as the example illustrated in FIGS. 17A and 17B, substantially sinusoidal currents are individually injected from the inverter device 101 into the U-phase and the W-phase of the single-phase three-wire electric power system. In addition, the voltage target values (Vu*, Vw*) are corrected so that the detection values (iu, iw) of the output currents become equal to the target values (iu*, iw*), and hence, feedback control is performed. Therefore, the currents of the target values are injected into the system.

Second Preferred Embodiment

In the first preferred embodiment, in particular as illustrated in FIGS. 13A to 13D and FIGS. 14A to 14D, an example has been illustrated where the switch elements S1 to S4 in the first three-level circuit 121 and the switch element S5 to S8 in the second three-level circuit 122 symmetrically coordinate with each other and are driven. However, the present invention is not limited to a configuration where driving is performed in such a way. In a second preferred embodiment, an example will be illustrated where the switch elements S1 to S4 in the first three-level circuit 121 and the switch element S5 to S8 in the second three-level circuit 122 are independently driven.

The circuit configuration of an inverter device in the second preferred embodiment is preferably the same or substantially the same as that illustrated in FIG. 1 and FIG. 2. Accordingly, the symbols illustrated in FIG. 1 and FIG. 2 will be referred to in the following description.

FIG. 24A is a diagram illustrating a relationship between the states of the switch elements S1 to S4 in the first three-level circuit 121 and the output voltage thereof in the inverter device in the second preferred embodiment, and FIG. 24B is a diagram illustrating a relationship between the states of the switch elements S5 to S8 in the second three-level circuit 122 and the output voltage thereof. FIG. 25 is a diagram illustrating a relationship among a time division illustrated in FIG. 15, the switching patterns of the first and second three-level circuits, the state of the bridge clamping circuit, and the average voltages of the terminals U and V. Furthermore, FIGS. 26A to 26D are diagrams illustrating current paths in four states CP1 to CP4 illustrated in FIG. 24A, and FIGS. 27A to 27D are diagrams illustrating current paths in four states CP5 to CP8 illustrated in FIG. 24B.

As is clear from these drawings, the switch elements S1 to S4 in the first three-level circuit 121 and the switch elements S5 to S8 in the second three-level circuit 122 may also be independently driven. For example, the state CP1 illustrated in FIG. 26A and the state CP8 illustrated in FIG. 27D may not be coordinated with each other.

Third Preferred Embodiment

While, in the first and second preferred embodiments, examples have been illustrated where the positive voltage and the negative voltage are preferably applied to the first input end IN1 and the second input end IN2, respectively, the present invention is not limited to a configuration where two voltages whose polarities are positive and negative are input. In a third preferred embodiment, an example will be illustrated where a direct-current voltage having a single polarity is input.

Figure 28:
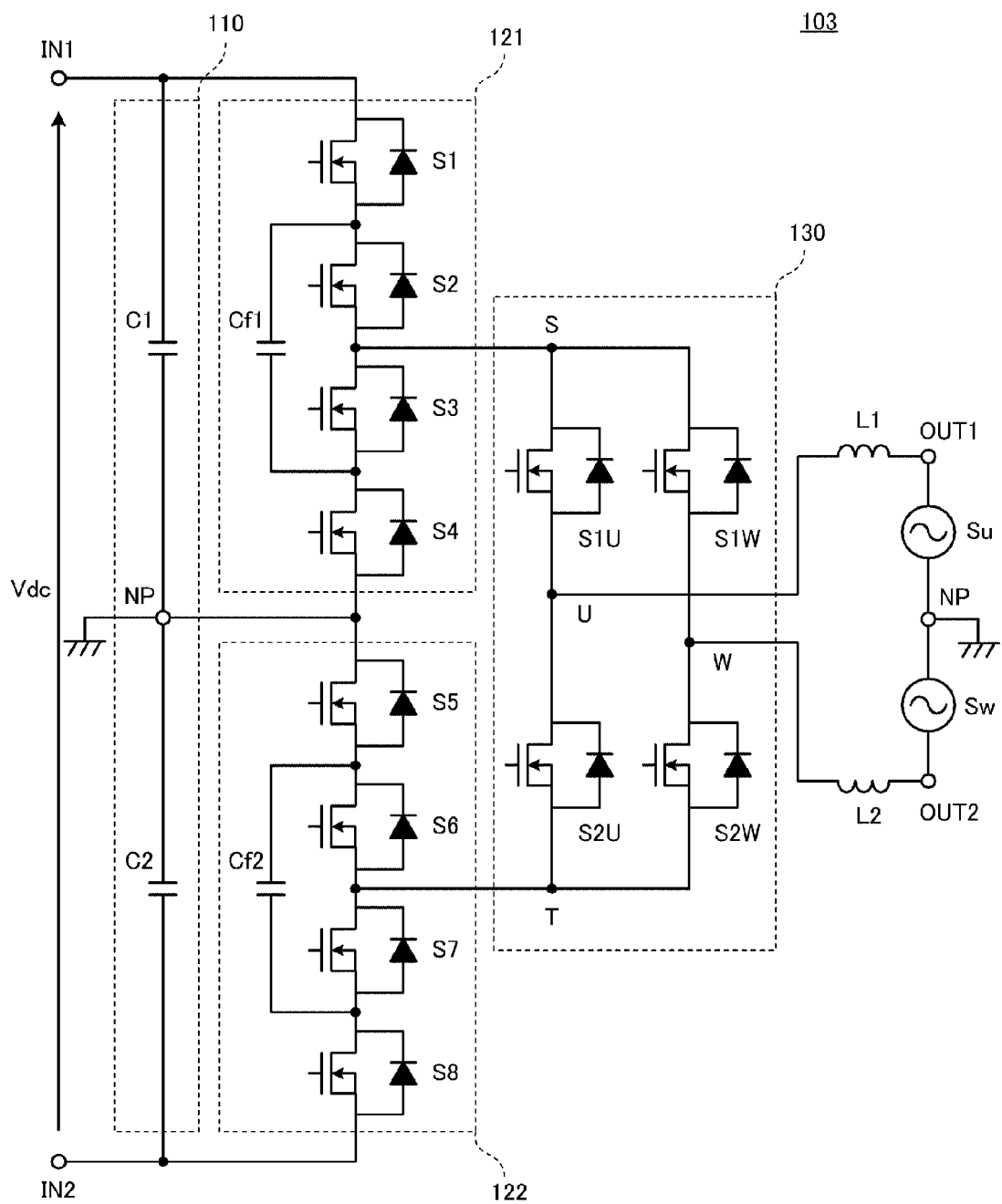
FIG. 28 is a circuit diagram of an inverter device according to a third preferred embodiment of the present invention.

FIG. 28 is the circuit diagram of an inverter device 103 according to the third preferred embodiment. This inverter device 103 preferably includes a first input end IN1 and a second input end IN2, into which a direct-current power supply voltage is input, and a first output end OUT1 and a second output end OUT2, from which alternating-current voltages are output. A direct-current voltage generated by, for example, a solar power generation panel is applied between the first input end IN1 and the second input end IN2.

A capacitor voltage-dividing circuit 110 is connected between the first input end IN1 and the second input end IN1. This capacitor voltage-dividing circuit 110 is a circuit including two capacitors C1 and C2 connected in series and a connection point between the capacitors C1 and C2 is connected to a neutral point NP.

The first three-level circuit 121 is connected between the first input end IN1 and the neutral point NP, and the second three-level circuit 122 is connected between the neutral point NP and the second input end IN1. The other circuits are preferably the same or substantially the same as the circuits illustrated in FIG. 2.

The capacitance values of the capacitors C1 and C2 in the capacitor voltage-dividing circuit 110 are equal to each other, and each of the capacitors C1 and C2 generates a voltage of a half of an applied voltage. When the direct-current voltage applied between the first input end IN1 and the second input end IN2 is expressed as Vdc, the electric potential of the second input end IN2 is 0 V, the electric potential of the neutral point NP is Vdc/2, and the electric potential of the first input end IN1 is Vdc. When the electric potential of the neutral point NP is deemed to be 0 V, the electric potential of the first input end IN1 is Vdc/2 and the electric potential of the second input end IN2 is −Vdc/2. Therefore, a circuit operation is preferably the same or substantially the same as the inverter device illustrated in the first preferred embodiment.

By providing the capacitor voltage-dividing circuit 110 in this way, the direct-current voltage having a single polarity is input, and it is possible to supply electric power to the single-phase three-wire system.

In addition, while, in the example illustrated in FIG. 18, the voltage correction values ΔVu and ΔVw in the directions reducing the current errors have been obtained due to the PI operations, an operation performed to obtain a correction value used for such feedback control is not limited to the PI operation. A PID operation may be available, and another operation may also be available.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power-system-interconnected inverter device comprising:
   a first three-level circuit including first, second, third and fourth preceding-stage switch elements connected in series between a first input end of a direct-current power supply and a neutral point and a first charging and discharging capacitor including a first end that is connected to a connection point between the first preceding-stage switch element and the second preceding-stage switch element and a second end that is connected to a connection point between the third preceding-stage switch element and the fourth preceding-stage switch element;
   a second three-level circuit including fifth, sixth, seventh and eighth preceding-stage switch elements connected in series between a neutral point and a second input end of the direct-current power supply and a second charging and discharging capacitor including a first end that is connected to a connection point between the fifth preceding-stage switch element and the sixth preceding-stage switch element and a second end that is connected to a connection point between the seventh preceding-stage switch element and the eighth preceding-stage switch;
   a bridge clamping circuit including first, second, third and fourth subsequent-stage switch elements bridge-connected to first, second, third and fourth terminals wherein a first end is connected to a connection point between the second preceding-stage switch element and the third preceding-stage switch element and a second end is connected to a connection point between the sixth preceding-stage switch element and the seventh preceding-stage switch element;
   a first inductor connected between a first output end and a connection point between the first subsequent-stage switch element and the second subsequent-stage switch element in the bridge clamping circuit;
   a second inductor connected between a second output end and a connection point between the third subsequent-stage switch element and the fourth subsequent-stage switch element in the bridge clamping circuit;
   a detection unit arranged to detect an output current and an output voltage of a single-phase three-wire power system having a U-phase and a W-phase;
   an amplification unit arranged to amplify a current error serving as an error of the output current with respect to a current target value of a substantially sinusoidal wave;
   a voltage correction value obtaining unit arranged to obtain a voltage correction value in a direction reducing the current error;
   a voltage target value obtaining unit arranged to obtain a voltage target value by superimposing the voltage correction value on a detection value of the output voltage;
   a PWM-modulation unit arranged to obtain a PWM-modulated signal of the voltage target value;
   a switch element drive unit arranged to drive the first, second, third and fourth preceding-stage switch elements and the fifth, sixth, seventh and eighth preceding-stage switch elements based on the PWM-modulated signal; and
   a switch unit arranged to switch a state of the bridge clamping circuit based on a sign of the voltage target value.

2. The power-system-interconnected inverter device according to claim 1, further comprising:
   a multiplexer arranged to switch an output of a voltage target value for the PWM-modulation unit used for the first three-level circuit and an output of a voltage target value for the PWM-modulation unit used for the second three-level circuit on the basis of the sign of the voltage target value.

3. The power-system-interconnected inverter device according to claim 1, wherein the power-system-interconnected inverter device is a five-level circuit that performs voltage conversion using five voltage levels.

4. The power-system-interconnected inverter device according to claim 1, wherein the first three-level circuit and the second three-level circuit are arranged to define a five-level circuit that performs voltage conversion using five voltage levels.

5. The power-system-interconnected inverter device according to claim 1, wherein each of the first, second, third and fourth preceding-stage switch elements includes a MOS-FET.

6. The power-system-interconnected inverter device according to claim 1, wherein each of the fifth, sixth, seventh and eighth preceding-stage switch elements includes a MOS-FET.

7. The power-system-interconnected inverter device according to claim 1, wherein each of the first, second, third and fourth subsequent-stage switch elements includes a MOS-FET.

8. The power-system-interconnected inverter device according to claim 1, wherein the PWM-modulation unit includes a first modulation circuit and a second modulation circuit.

9. The power-system-interconnected inverter device according to claim 8, wherein the first modulation circuit includes a first PWM modulation circuit and a first switch element drive circuit, and the second modulation circuit includes a second PWM modulation circuit and a second switch element drive circuit.

10. The power-system-interconnected inverter device according to claim 1, wherein the first, second, third and fourth preceding-stage switch elements of the first three-level circuit, and the fifth, sixth, seventh, and eighth preceding-stage switch elements of the second three-level circuit are symmetrically coordinated with each other and driven together.

11. The power-system-interconnected inverter device according to claim 1, wherein the first, second, third and fourth preceding-stage switch elements of the first three-level circuit, and the fifth, sixth, seventh, and eighth preceding-stage switch elements of the second three-level circuit are driven independently.

12. The power-system-interconnected inverter device according to claim 1, wherein the first input end is arranged to receive a positive voltage and the second input end is arranged to receive a negative voltage.

13. The power-system-interconnected inverter device according to claim 1, wherein the first input end and the second input end are arranged to receive a direct-current voltage having a single polarity.

14. The power-system-interconnected inverter device according to claim 1, further comprising a capacitor voltage-dividing circuit connected between the first input end and the second input end.

15. The power-system-interconnected inverter device according to claim 14, wherein the capacitor voltage-dividing circuit includes two capacitors connected in series and a connection point between the two capacitors is connected to a neutral point.

16. The power-system-interconnected inverter device according to claim 15, wherein the first three-level circuit is connected between the first input end and the neutral point, and the second three-level circuit is connected between the neutral point and the second input end.

* * * * *